Oct. 11, 1955    H. G. HENRICKSON    2,720,289
FASTENER ELEMENT
Filed June 5, 1951                    2 Sheets-Sheet 1
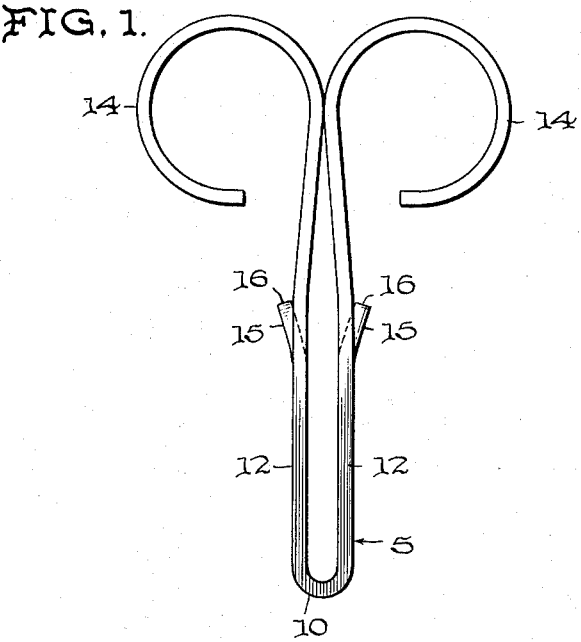
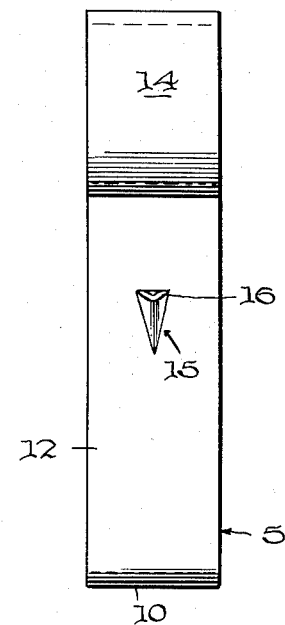
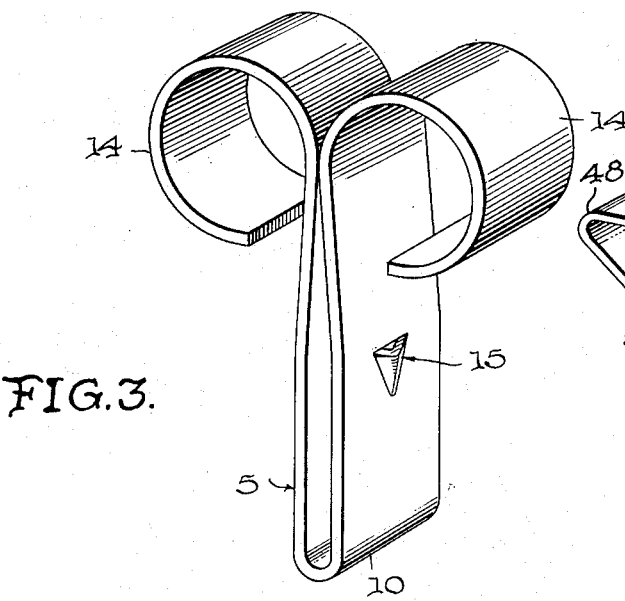
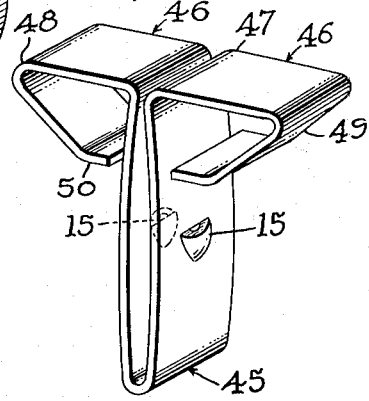
INVENTOR.
Henry G. Henrickson
BY
James E. Tooney
ATTORNEY

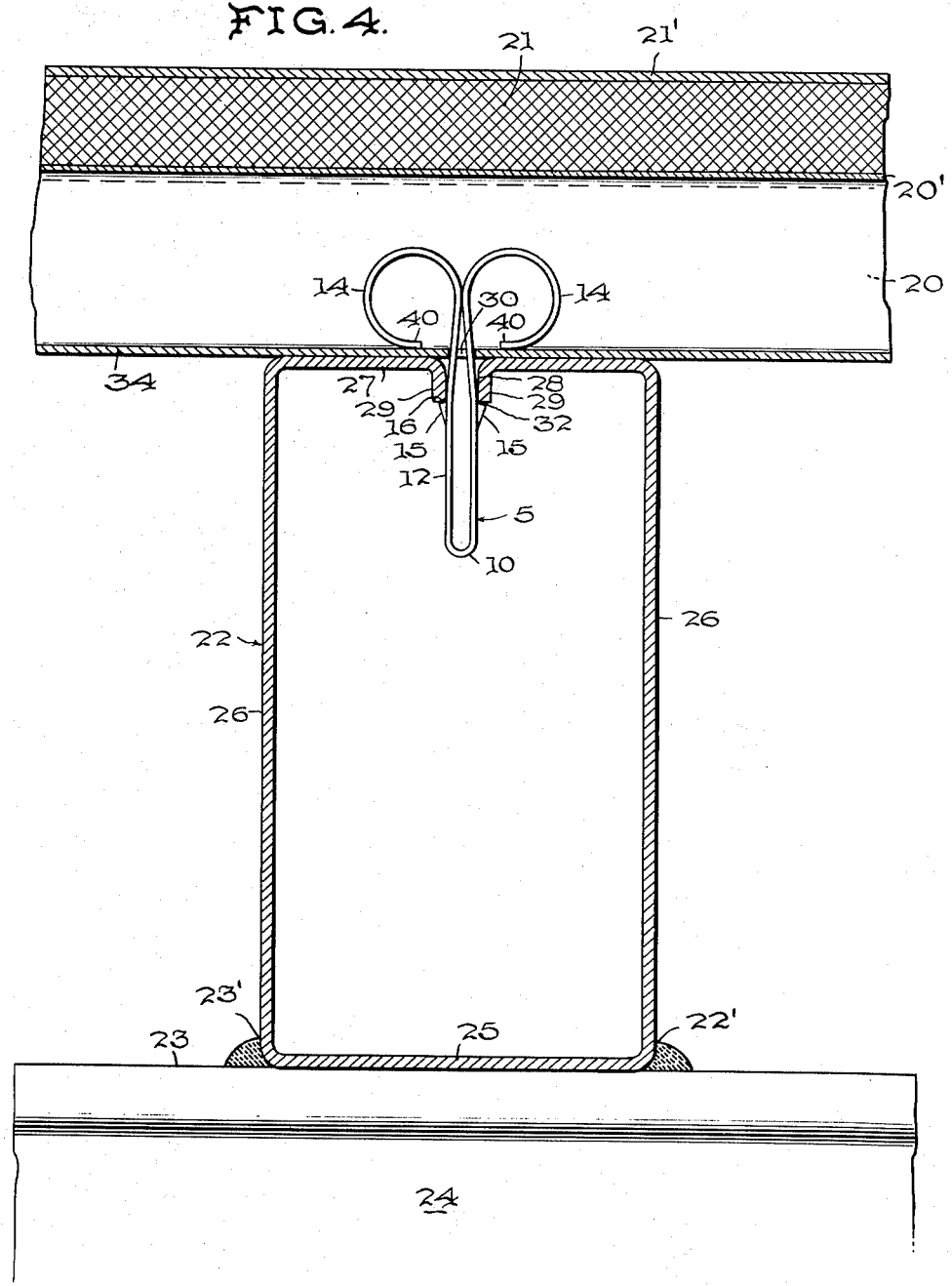

United States Patent Office 2,720,289
Patented Oct. 11, 1955

2,720,289

FASTENER ELEMENT

Henry G. Henrickson, Des Plaines, Ill., assignor, by mesne assignments, to Kaiser Aluminum & Chemical Corporation, Oakland, Calif., a corporation of Delaware Application June 5, 1951, Serial No. 230,032

11 Claims. (Cl. 189—34)

This invention relates to fastening devices made from sheet metal, which are adapted to be used as a substitute for bolts, screws, nails and the like for securing two bodies together. More particularly it is concerned with providing a resilient spring clip fastener, which, when utilized as a means for anchoring a sheet metal panel to a hollow rib supporting member, readily and easily adjusts itself to any relative movement that the panel may make with respect to the supporting member, once it has been emplaced, thereby maintaining both panel and supporting member at all times in a firm locked condition and without unnecessarily deforming either of the last mentioned elements. It is particularly adapted for use with the sheet metal foundation disclosed in my copending application S. N. 230,033, filed June 5, 1951.

In the construction of sheet metal foundations for roofs, floors, and the like of buildings considerable difficulty has been experienced in the past in finding a truly suitable fastening device for locking the sheet metal panel units that form the exposed surface thereof to a load supporting member.

Most of these fasteners were of a rigid type which would not flex or bend so as to readily adjust themselves to varying atmospheric conditions or the varying conditions of installation.

In addition due to the fact that these fasteners were of relatively rigid construction very little if any relative movement was allowed between the two members, once they were locked together by the fastening elements without permanently deforming one or both of the locked together members or the fastener itself.

Consequently when the fasteners were used to secure sheet metal panels to a supporting member so as to form the roof of a building no provision was made for allowing the roof "to breathe." Put in another way, when differences in air pressures existed between the inside and outside of a building no provision was made for the panels to flex or to move even a small amount in a vertical or lateral plane away from the supporting member without seriously disturbing the fastener or working it loose.

Thus for example when sheet metal roofing panels were rigidly locked to a supporting member so as to form the roof of a building and an explosion took place within the building, the panel would completely resist the upward surge of air, instead of tending to ride or roll therewith, and consequently would frequently be ripped off.

Certain of the fasteners which were designed to obviate such a condition as this were unsatisfactory since although they allowed for relative movement between the roofing panel and a supporting member, they did not always provide for a snug tight fit between the supporting member and the panel during the normal installation of the same. Instead, they held the two members more or less loosely together.

These fasteners also failed to compensate for any relative movement of the roofing panel and supporting member caused by sudden expansions and contractions thereof that occurred as a result of the installation thereof in certain types of localities and climates subject to rapidly changing weather conditions.

It is an object of this invention therefore to provide a novel type of spring fastener clip for fastening a sheet metal panel to a support which adjusts itself to varying types of conditions both of weather and installation.

It is another object of this invention to provide a novel type of spring fastener clip for securing together a sheet metal panel to a support which is relatively flexible and self-adjusting whereby any relative movement between panel and support is compensated for, without sacrificing any of the inherent locking qualities of the fastener.

It is a further object of this invention to provide a novel fastening element for securing together a supporting member and a roofing panel sheet, which is of exceptionally simple design and which lends itself to inexpensive and quick fabrication.

Another object of this invention is to provide a novel fastener element for securing together a roofing panel or the like and its associated supporting member, which can be fabricated from a single piece of resilient and springy metal.

A further object of this invention is to provide a novel fastening element for locking a roofing panel and the like to a supporting member, which is flexible and which will continue to securely hold panel and supporting member together regardless of the differences in air pressures that may exist on the different sides of the panel and without seriously deforming itself, the supporting member or panel.

These and other objects are accomplished by providing in a spring clip device for securing an apertured sheet metal panel to a support having a continuous longitudinal slot in registry with an aperture in the panel, the improvement which comprises forming the clip device from a single piece of resilient metal of uniform width successively bent so as to have a narrow U-shaped nose intermediate its end portions and leg elements projecting upwardly from said nose portion. The lower portion of the leg elements are provided with laterally pressed out semi-conical shaped ear portions or protuberances that project upwardly therefrom. Each of the leg elements finally terminates in oppositely disposed, flexible and almost completely circular head portions which are adapted to tangentially and continuously contact the exposed surface of a sheet metal panel, while the ear portions of the leg elements are adapted to positively engage the support so as to firmly anchor the panel to the support when the clip fastener has been inserted endwise and legs foremost through an aperture in the panel and the slot in the support.

Other specific objects and advantages of the invention will more clearly appear from a consideration of the following detailed description when taken in conjunction with the drawings wherein:

Figure 1 is a front elevational view of the spring clip fastener of the instant invention;

Figure 2 is a side elevational view of the spring clip fastener shown in Figure 1;

Figure 3 is a perspective view of the clip fastener shown in Figures 1 and 2;

Figure 4 is a cross-sectional view of a hollow supporting rib mounted upon a purlin or the like and discloses the manner in which the spring clip fastener is used to lock a sheet metal panel to the hollow rib; and Figure 5 is a perspective view of a modified form of spring clip fastener of the present invention.

With further reference to the drawings and particularly Figure 1 the spring clip fastener 5 of the instant invention is preferably formed from a resilient piece of metal of suitable temper and gauge and preferably though not necessarily of uniform width, which is succesively bent so as to be provided with a relatively narrow nose portion 10 and a pair of upwardly projecting leg elements 12 which terminate in oppositely disposed circular head portions 14.

The lower portions of the leg elements are further provided with upwardly and outwardly projecting ears or protuberances 15. Although these ears can be made in the form of struck out sections in the leg elements and be integral with or in intimate contact with the main part of a leg element only at the bottom portion of the protuberances or ears they are preferably pressed out of the leg elements in such a way that a complete break with the rest of the leg element and a fin occurs only at the top shoulder or margin 16 thereof and the main body 17 of each ear is further formed in such a way that it outwardly assumes the shape of one half of an inverted cone. This is an important feature which will be more fully discussed later.

Although it is obvious that this clip fastener has numerous applications and can be advantageously used in locking together numerous types of supporting members and panels, it is particularly adapted to secure a sheet metal panel 20 (which is preferably corrugated) to a hollow rib supporting member 22 of springy metal such as spring steel suitably arranged upon the bearing surface 23 of a beam or purlin 24. These last three elements, panel 20, rib 22, and purlin 24, combine to form a solid and rigid metal foundation for a roof, floor and the like of a building. When this type of sheet metal foundation is used in a roofing construction it is frequently desirable to cover the same with a suitable type of insulation 21, which may be of asbestos or some other like material and a metallic skin or covering 21' is adhesively secured to the insulating material 21. When the metal foundation is used for this purpose it is also commonly referred to as a roof deck assembly.

By referring to Figure 4 it will be readily observed that although the hollow rib 22 may be of any suitable design it is preferably made from an elongated strip of spring steel successively bent so as to be provided with a bottom portion or base 25, and side walls 26 the upper extremities of which are bent inwardly to provide a panel contacting face 27 of substantial area. This contacting face 27 of the hollow rib 22 is further provided with a continuous longitudinal slot or mouth 28 defined by the flanges 29 of the contacting face 27 which are so bent as to project downwardly into the hollow interior of the rib.

When a sheet metal panel 20 is arranged upon this rib 22 in such a fashion that the apertures 30 therein are in registry with the continuous slot or mouth 28 of the rib the clip fastener may then be thrust endwise and legs foremost through the aperture in the sheet metal panel and the continuous longitudinal slot 28 in the rib 22 so as to anchor the panel to the rib.

In this connection, when the clip fastener is thrust through the openings in the panel and rib, it is forced down far enough for the top margins or shoulders 16 of the ears 15 on leg elements 12 to engage the bottom surfaces or margins 32 of the flanges 29 of the rib, while the circular head portions of the spring clip 5 simultaneously engage and tangentially contact the exposed upper surface 34 of the sheet or panel 20. In this way sheet 20 and rib 22 are securely locked together.

When the lower portion of clip 5 has been inserted in the slot or mouth portion 28 of a hollow rib in such a way that the shoulders 16 of the ears 15 on the clip are in engagement with the flanges 29 on the rib it will be observed that the ears 15 and the shoulders 16 will always be under tension due to the clamping action of the flanges 29 about the springy legs 12 of the clip as well as the spring action of the head portions 14 thereof against the top of the sheet metal panel 20.

This allows for a substantial tolerance in the opening of the flanges 29 of the hollow rib without at the same time permitting the sheet metal panel 20 to become unlocked from the rib. In other words if for some reason the mouth 28 of the hollow rib should be forced open due to excessive loads or pressure the ears 15 on the clip would follow the flanges 29 in their movement and remain in constant contact therewith. This also allows two or more fasteners to be installed one behind the other in tandem fashion and still maintain the necessary contact between both of the fasteners, and the rib and sheet metal panel even though slight discrepancies in size or shape may exist between the two fasteners as a result of fabrication. This is extremely important when nailing or fastening a metallic sheet to a hollow metal rib through the medium of a groove or flange contact as is disclosed in the instant invention.

Any suitable type of fastening means such as that shown in my copending application S. N. 230,033 filed June 5, 1951, may be used for anchoring the ribs 22 to the purlins 24, or where such special fastening elements are not readily available the bottom corners 22' and 23' of the ribs 22 may be welded directly to purlins 24 as is indicated in Figure 4.

It will likewise be observed by referring to Figure 4 that the semi-conical shape of the ears 15 is most advantageous during the time that the clip fastener is forced through aperture 30 in the panel and then through the slot 28 in the rib.

Its smooth almost completely unbroken exterior permits it to slide freely and easily through the two openings. The semi-conical shape of the ears also permits them to act as a cam whereby the flanges 29 of the rib are easily forced apart as the ears pass therebetween after which flanges 29 are allowed to come together when the ears are completely through the slot.

Of equal or greater importance in the efficient and satisfactory use of clip fastener 5 is the manner in which the rounded or circular heads 14 of the clip fastener function. It will be noted that due to the fact that they are in the form of almost a complete circle they tangentially contact the upper surface 34 of the panel 20 at all times. This means that regardless of any relative movement of the beam or rib 22 with respect to panel 20 they will always be locked together since at all times at least one section or portion of each head 14 will be in intimate contact with the top surface of the panel. This is also made possible because the clip is fabricated from a piece of resilient or springy metal which allows the heads 14 to flex and bend as the panel 20 moves vertically or laterally with respect to rib 22 without at the same time losing contact with the upper surface of panel 20 or without permanently deforming the clip fastener itself.

In this way also the roof assembly is permitted "to breathe" as it were and when differences in air pressures occur between the two sides of the panel such as for example when there is an explosion within the building, to which the roof deck has been affixed and the panel tends to tear away from the rib 22 the heads of the clip fastener will flex and bend and although allowing movement of the panel away from rib it will not allow it to come loose therefrom but instead will permit the panel to absorb the shock as the lower portions 40 of the heads 14 flex or bend upwardly.

During this action of flexible heads 14 of the clip fastener the portion of the ears 15 on the leg elements with respect to the flanges 29 of the ribs will remain unchanged.

The circular shape of the heads 14 on the clips has a further advantage in that they can readily serve as a means for fastening a rigid or board type of insulation to the sheet metal panel 20 when suitable wires, hooks, or the like affixed to the board insulation are also locked to heads 14 of the emplaced clips 5.

The flexibility of the clip fastener, while it prevents any serious deformation or distortion of the sheet 20 or rib 22 when movement occurs between them, forces the fastener to maintain contact between the panel and the support.

Accordingly, the particular design of the clip fastener permits either lateral or vertical movement of the panel 20 away from the rib 22 or a combination of both since the circular design of the heads 14 and their flexibility always keep them in contact with the upper surface of panel 20, while the ears 15 on the clip fasteners legs 12 maintain firm contact with the rib 22 through the medium of the flanges 29 thereon.

The rounded shape of the heads 14 also provides the clip fastener with a smooth, even surface which will not mar or dent the surfaces of the sheet metal panel if movement thereof occurs. This is important when the sheets 20 are made of galvanized steel or the like material since a continued sharp frictional engagement between the fastener and the sheet would in time cause the galvanized coating on the sheet at the point of contact to be worn away thereby exposing the sheet to oxidation. In certain types of roof assembly it will also be observed by referring to Figure 4 that a suitable type of insulating paper or metal skin 20′ may be interposed between the insulation material 21 and the panels 20.

The modified form of spring clip fastener shown in Figure 5 is generally designated as 45. The base or leg portions thereof, including the struck-out portion generally referred to as ears, are essentially identical to the form of the invention disclosed in Figures 1 to 4 of this specification. However, as is apparent from Figure 5, the head portions 46 of the modified fastener differ from the head portions of the other form of the invention in that they each include an upper flat portion 47, a bent area 48, a straight normally diagonally disposed portion 49, and a flattened lower sheet contacting portion 50 of substantial area.

When in use each head portion of this modified clip bends, or is fulcrumed, about bent portion 48, and as in the case of the other form of clip disclosed herein it remains in continuous contact with the outer surface of a panel 20 fastened to the rib, since because of its construction it is adapted to resiliently yield to the stresses and strains that occur during the so-called "breathing" action and the like which the roof deck may be required to undergo.

From the above discussion therefore it will be understood that a novel type of fastening element has been developed for securing a sheet metal panel to a supporting rib which although relatively simple in design and inexpensive to manufacture yet is so flexible and self-adjusting that any relative movement between a panel and a support which are locked together thereby is immediately compensated for, without sacrificing any of the inherent locking qualities of the fastener.

Advantageous embodiments of the invention have been herein illustrated and described. It will be understood however that modifications can be made therein without departing either from the spirit and scope thereof as defined by the appended claims.

I claim:

1. A spring clip fastening device of the character described for securing an apertured sheet metal panel to a hollow support provided with a contacting face of substantial area and a continuous slot therein defined by turned-in flexible flanges, comprising a strip of resilient metal of uniform width successively bent so as to provide a narrow U-shaped nose intermediate its end portions, leg elements having unbroken marginal edges projecting substantially vertically upward from said nose portion, the lower portion of said leg elements being provided with rigid pressed out semi-conical shaped ear portions projecting upwardly and outwardly at an acute angle therefrom intermediate the marginal edges of said legs and each of said leg elements finally terminating in an outwardly projecting circular head portion of uniform configuration along the entire width thereof for tangentially and continuously contacting the exposed surface of said sheet metal panel at all times with said ear portions engaging the flexible flanges of said support to thereby anchor said sheet metal panel to the face of said support when said spring clip fastener has been inserted endwise, legs foremost through said aperture in said panel and said slot in said support.

2. In a fastening device of the character described which is adapted to anchor an apertured sheet metal panel to a hollow support formed from a sheet of metal, the walls of which are bent so as to provide a panel bearing surface and said panel bearing surface being provided with downwardly projecting flexible shoulder portions defining a continuous longitudinal slot in said bearing surface, the improvement which comprises a spring clip fastener made from a strip of resilient metal of uniform width successively bent so as to provide a narrow U-shaped nose portion intermediate its end portions, leg elements having unbroken marginal edges projecting upwardly from said nose portion, the lower portion of said leg elements being provided with pressed out rigid ear portions projecting upwardly and outwardly at an acute angle therefrom intermediate the marginal edges of said legs and each of said leg elements finally terminating in an almost completely circular head portion of uniform configuration along the entire width thereof for tangentially and continuously contacting the exposed surface of said sheet metal panel at all times, while said ear portions engage said downwardly projecting flexible shoulder portions of said support to thereby anchor said panel to the bearing surface of said support when said fastener has been inserted endwise, legs foremost through an aperture in said panel and the slot in said support.

3. In a spring clip device for securing a sheet metal panel to a hollow support having a contacting face of substantial area provided with a continuous longitudinal slot in registry with an aperture in said sheet metal panel and said slot being defined by flexible turned-in flanges, the improvement which comprises forming the clip device from a single piece of resilient metal of uniform width successively bent so as to provide a narrow U-shaped nose portion intermediate its end portions, leg elements having unbroken marginal edges projecting upwardly from said nose portion, the lower portion of said leg elements being provided with pressed out semi-conical rigid ear portions intermediate the marginal edges of said legs and projecting upwardly and outwardly therefrom and each of said leg elements finally terminating in oppositely disposed flexible circular head portions of uniform configuration along the entire width thereof for tangentially contacting and remaining in engagement with the exposed surface of said sheet metal panel and with the upper extremities of said ear portions positively engaging the flexible flanges of said support so as to anchor said sheet metal panel to the contacting face of said support when said spring clip fastener has been inserted endwise, legs foremost through the aperture in said panel and the slot in said support.

4. In combination with a hollow rib supporting member the walls of which are bent so as to provide a load bearing surface having a continuous slot located therein, said slot in turn being defined by down-turned flexible flanges, and an apertured sheet metal panel arranged upon the load bearing surface of said supporting member in such a fashion that the apertures therein are in registry with the continuous slot in the bearing surface of said supporting member, a spring clip fastener anchoring said sheet metal panel to said hollow rib, said spring clip fastener being formed from a single piece of resilient metal of uniform width successively bent so as to be provided with a narrow U-shaped nose portion intermediate the ends thereof, leg elements having unbroken marginal edges projecting upwardly from said nose portion, the lower portion of said leg elements being provided with pressed out rigid semi-conical ear portions projecting upwardly and outwardly therefrom and each of said leg elements finally terminating in oppositely disposed flexible circular head portions, each of said head portions in turn being of uniform configuration along the entire width thereof for tangentially contacting and remaining in engagement with the exposed surface of said sheet metal panel and with said ear portions positively engaging the flexible flanges of said hollow rib adjacent the bearing surface slot thereof so as to anchor said sheet metal panel to the load bearing surface of said rib when said spring clip fastener has been inserted endwise, legs foremost through an aperture in said panel and the slot in said support.

5. In combination with a hollow rib supporting member formed from springy metal the walls of which are bent so as to provide a panel contacting surface having a continuous longitudinal slot located therein, said slot in turn being defined by down-turned flexible flanges, and an apertured sheet metal panel arranged upon the panel contacting surface of said rib in such a fashion that the apertures therein are in registry with the slot in the bearing surface of said hollow rib, a spring clip fastener anchoring said sheet metal panel to said hollow rib, said spring clip fastener being formed from a single piece of resilient metal of uniform width successively bent so as to provide a relatively narrow U-shaped nose portion intermediate the ends thereof, leg elements having unbroken marginal edges projecting upwardly from said nose portion, the lower portion of said leg elements being provided with pressed out rigid semi-conical open-topped ears that project upwardly and outwardly therefrom and each of said leg elements finally terminating in oppositely disposed flexible circular head portions, each of said head portions in turn being of uniform configuration along the entire width thereof for tangentially contacting and remaining in engagement with the exposed surface of said sheet metal panel and the open tops of said ear portions positively engaging the flexible flanges of said hollow rib adjacent the bearing surface slot thereof so as to anchor said sheet metal panel to the panel contacting surface of said rib when said clip fastener has been inserted endwise and legs foremost through an aperture in said panel and said slot in said rib.

6. In a fastening device of the character described which is adapted to anchor an apertured sheet metal panel to a support formed from a piece of springy metal the walls of which are bent so as to provide a panel bearing surface having a continuous slot therein, said slot being defined by down-turned marginal flexible shoulders on said walls of said support and said slot also being aligned with the apertures in said panel, the improvement which comprises a spring clip fastener made from a strip of resilient metal of uniform width successively bent so as to provide a narrow U-shaped nose intermediate its end portions, leg elements having unbroken marginal edges projecting upwardly from said nose portion, the lower portion of said leg elements being provided with laterally pressed out semi-conical rigid protuberances projecting outwardly and upwardly at an acute angle therefrom and each of said leg elements finally terminating in an almost completely circular head portion, each of said head portions in turn being of uniform configuration along the entire width thereof for tangentially and continuously contacting the exposed surface of said sheet metal panel and said rigid protuberances engaging the downwardly projecting flexible shoulder portions of said support along the upper margins of said protuberances to thereby anchor said panel to the panel bearing surface of said support when said fastener has been inserted endwise and legs foremost through an aperture in said panel and said slot in said support.

7. In a panel assembly of the type described, wherein an apertured sheet metal panel is anchored to a continuous slot located in the upper bearing surface of a hollow rib arranged upon and welded to a primary supporting member, said slot being defined by downwardly turned flexible flanges, the improvement which comprises a novel clip fastener element for anchoring said panel to the slotted upper bearing surface of said rib, said fastener element being formed from a piece of springy metal of uniform width successively bent so as to be provided with a thin nose portion, intermediate the ends thereof, oppositely disposed leg elements having unbroken marginal edges projecting upwardly from said nose portion, the lower portion of said leg elements being provided with pressed out upwardly projecting semi-conical rigid ears and each of said leg elements finally terminating in oppositely disposed flexible outwardly and then downwardly and inwardly projecting head portions, each of said head portions in turn being of uniform configuration along the entire width thereof with the bottom surfaces of said head portions contacting and remaining in engagement with the exposed surface of said panel and said ears continuously and positively engaging the down-turned flexible flanges in the slotted upper bearing surface of said hollow rib so as to anchor said panel to the said bearing surface of said rib when said clip fastener has been inserted endwise and legs foremost through an aperture in said panel and the slotted portion of said rib.

8. In a panel assembly of the type described, wherein an apertured sheet metal panel is anchored in a continuous slot located in the upper bearing surface of a hollow rib arranged upon and welded to a primary supporting member, said slot being defined by downwardly turned flexible flanges, the improvement which comprises a novel clip fastener element for anchoring said panel to the slotted upper bearing surface of said rib, said fastener element being formed from a piece of springy metal of uniform width successively bent so as to be provided with a thin nose portion intermediate the ends thereof, oppositely disposed legs element having unbroken marginal edges projecting upwardly from said nose portion, the lower portion of said leg elements being provided with pressed out upwardly projecting semi-conical rigid ears and each of said leg elements finally terminating in oppositely disposed flexible head elements, and each of said head elements being of uniform configuration along the entire width thereof each of said head elements being comprised of a substantially flat outwardly projecting portion, a bent portion, a downwardly and inwardly projecting web portion and an inwardly directed panel contacting portion, said last mentioned portion of said head elements continuously contacting the exposed surface of the panel with said ears continuously and positively engaging the down-turned flexible flanges in the slotted upper bearing surface of said hollow rib so as to anchor said panel to the said bearing surface of said rib when said clip fastener has been inserted endwise and legs foremost through an aperture in said panel and then through the slotted portion of said rib.

9. In a panel assembly of the type described, wherein an apertured sheet metal panel is anchored in a continuous slot located in the upper bearing surface of a hollow rib, said slot being defined by downwardly turned flexible flanges, the improvement which comprises a novel clip fastener element for anchoring said panel to the slotted upper bearing surface of said rib, said fastener element being formed from a strip of springy metal of uniform width successively bent so as to be provided with a narrow U-shaped nose portion intermediate the ends thereof, oppositely disposed leg elements having unbroken marginal edges projecting upwardly from said nose portion, the lower portion of said leg elements being provided with pressed out upwardly projecting semi-conical rigid ears and each of said leg elements finally terminating in oppositely disposed flexible, outwardly and then downwardly and inwardly projecting head portions, each of said head portions being of uniform configuration along the entire width thereof the bottom surfaces of said head portions continuously contacting the exposed surface of said panel with said ears continuously and positively engaging the down-turned flexible flanges in the slotted upper bearing surface of said hollow rib so as to anchor said panel to the said bearing surface of said rib when said clip fastener has been inserted endwise and legs foremost through an aperture in said panel and the slotted portion of said rib.

10. In a panel assembly of the type described, wherein an apertured sheet metal panel is anchored in a continuous slot located in the upper bearing surface of a hollow rib supported by and affixed to a primary load bearing member, said slot being defined by downwardly turned flexible flanges, the improvement which comprises a novel clip fastener element for anchoring said panel to the slotted upper bearing surface of said rib, said fastener element being formed from a strip of springy metal of uniform width successively bent so as to be provided with a narrow U-shaped nose portion, intermediate the ends thereof, oppositely disposed flexible leg elements having unbroken marginal edges projecting upwardly from said nose portion, the lower portion of said leg elements being provided with pressed out upwardly projecting semi-conical rigid ears having open tops and each of said leg elements finally terminating in oppositely disposed flexible head elements, and each of said head elements being of uniform configuration along the entire width thereof, each of said head elements in turn also being comprised of a substantially flat outwardly projecting portion, a bent portion, a downwardly and inwardly projecting web portion and an inwardly directed panel contacting portion, said last mentioned portion of said leg elements continuously contacting the exposed surface of the panel with the open tops of said ears continuously and positively engaging the down-turned flexible flanges in the slotted upper bearing surface of said hollow rib so as to anchor said panel to the said bearing surface of said rib when said clip fastener has been inserted endwise and legs foremost through an aperture in said panel and then through the slotted portion of said rib.

11. In a panel assembly of the type described, wherein an apertured metal panel is anchored to the slotted upper bearing surface of a hollow rib arranged upon and welded to a primary supporting member, the improvement which comprises a novel clip fastener element for anchoring said panel to the slotted upper bearing surface of said rib, said fastener element being formed from a piece of springy metal successively bent so as to be provided with a thin U-shaped nose portion intermediate the ends thereof, oppositely disposed leg elements having unbroken marginal edges projecting upwardly from said nose portion, the lower portion of said leg elements being provided with pressed out upwardly projecting semi-conical fins, shoulders on said fins, and each of said leg elements finally terminating in oppositely disposed flexible outwardly and then downwardly and inwardly projecting head portions, each of said head portions being of uniform configuration along the entire width thereof with the bottom surfaces of said head portions contacting and remaining in engagement with the exposed surface of said panel and the shoulders of said fins continuously and positively engaging the slotted upper bearing surface of said hollow rib so as to anchor said panel firmly to the said bearing surface of said rib when said clip fastener has been inserted endwise and legs foremost through an aperture in said panel and the slotted portion of said rib.

References Cited in the file of this patent

UNITED STATES PATENTS 1,962,568   McKenney _____ June 12, 1934